Jan. 27, 1959 P. BONNAFOUX 2,870,481
ROTARY PELLET MILL
Filed Feb. 24, 1956 3 Sheets-Sheet 2
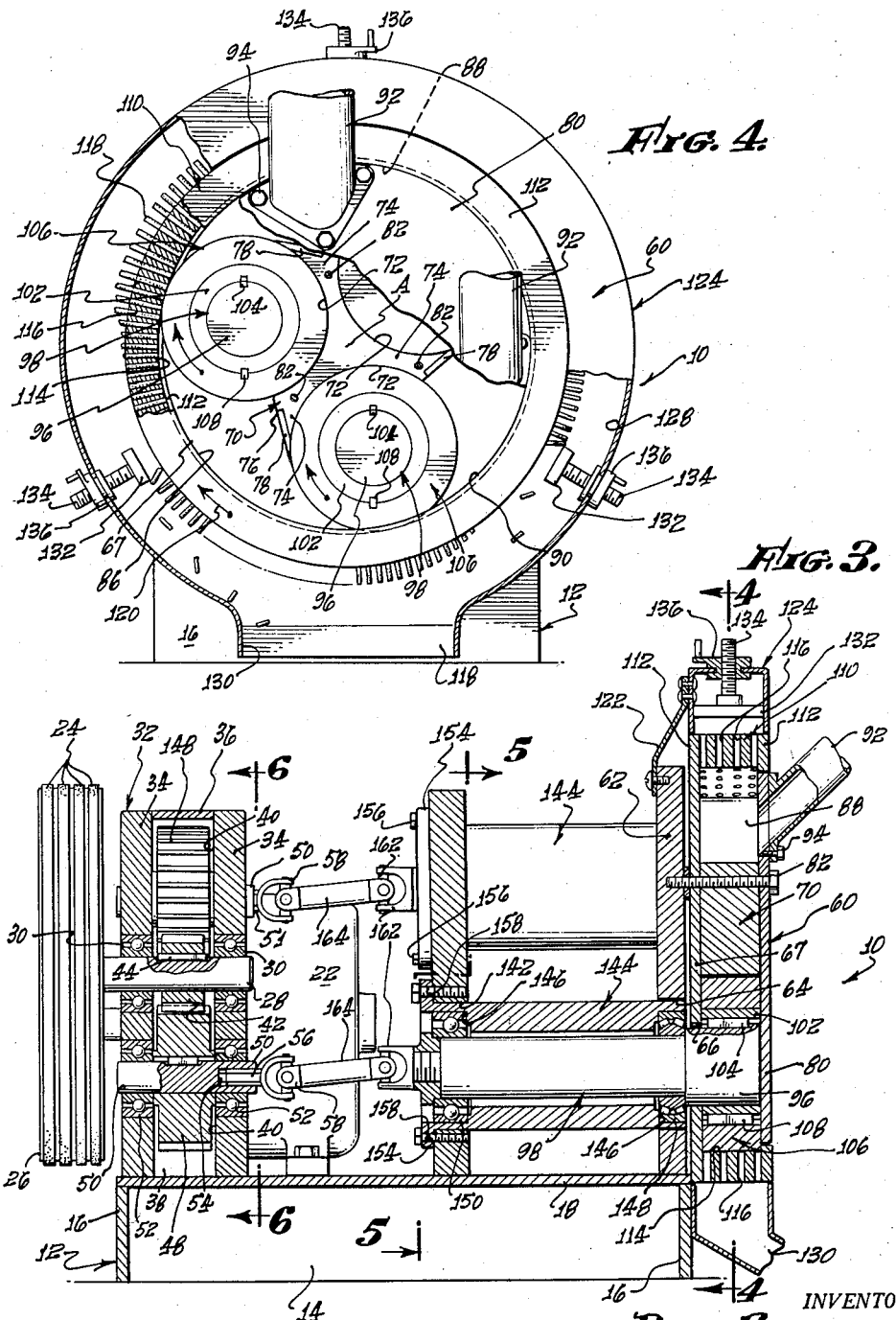
INVENTOR.
PAUL BONNAFOUX,
BY Thomas P. Mahoney
ATTORNEY.

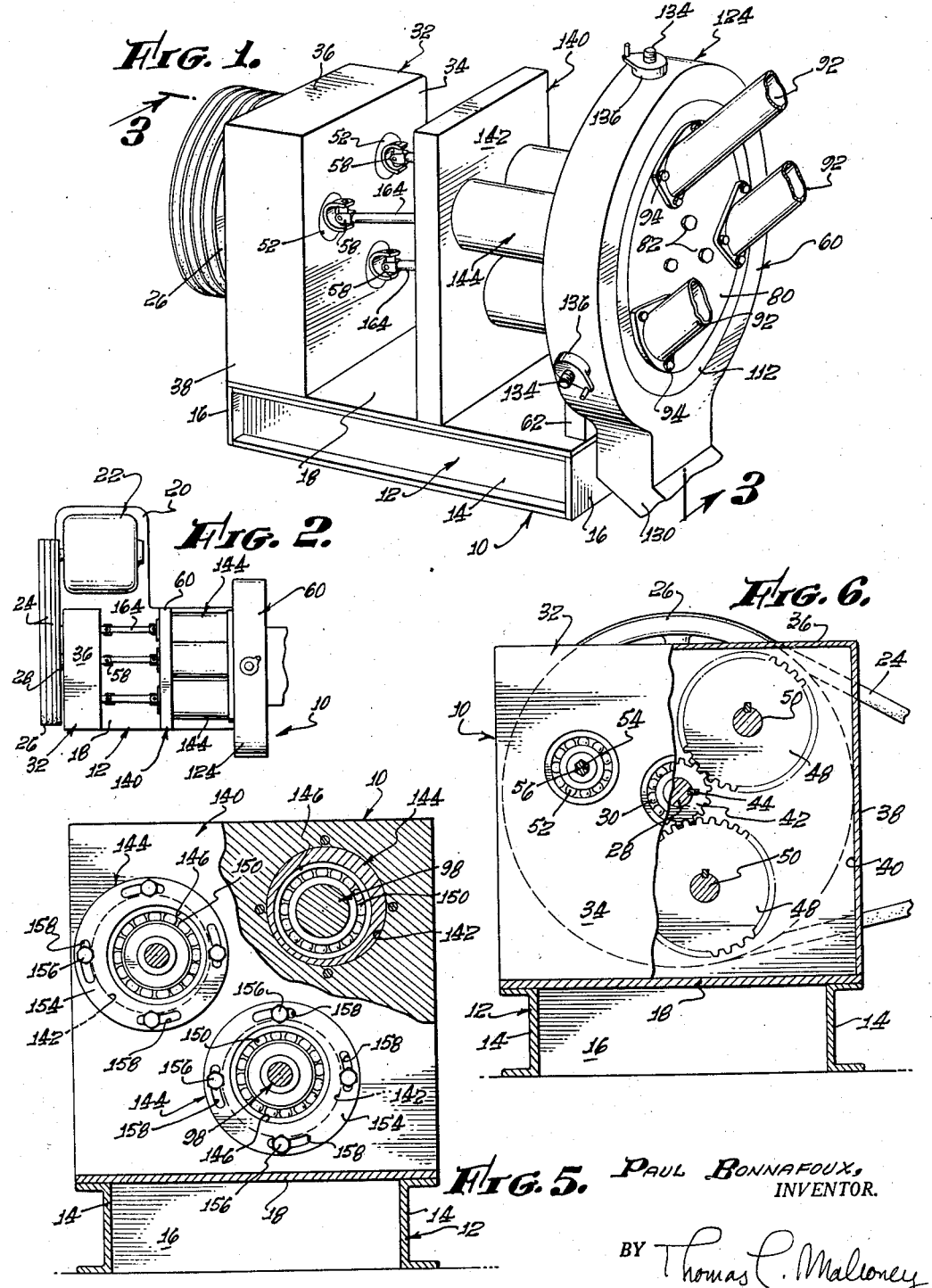

Jan. 27, 1959  P. BONNAFOUX  2,870,481
ROTARY PELLET MILL
Filed Feb. 24, 1956  3 Sheets-Sheet 3
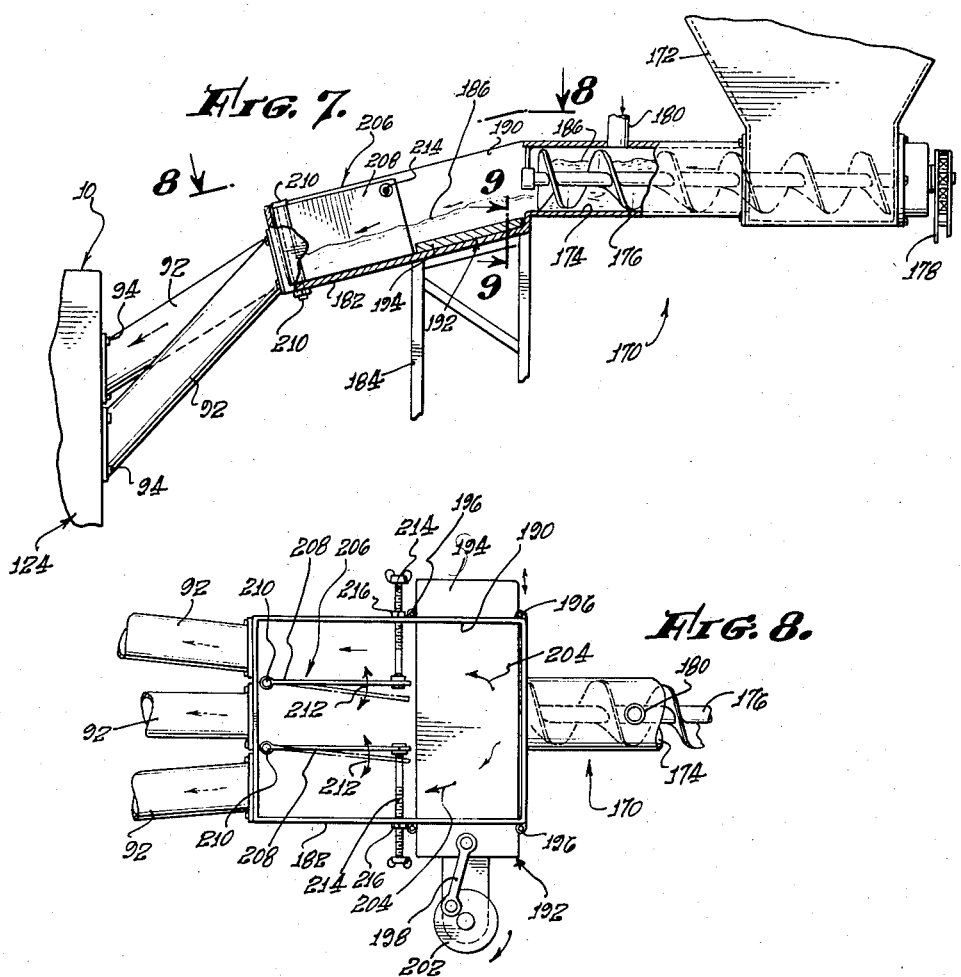
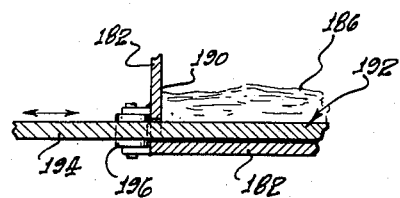
PAUL BONNAFOUX,
INVENTOR.
BY Thomas P. Maloney
ATTORNEY.

United States Patent Office 2,870,481
Patented Jan. 27, 1959

2,870,481

ROTARY PELLET MILL

Paul Bonnafoux, Lancaster, Calif.

Application February 24, 1956, Serial No. 567,670

8 Claims. (Cl. 18—12)

This invention relates to a rotary pellet mill and, more particularly, to a pellet mill wherein comminuted feeds and the like are fed into the mill and extruded thereby in the shape of hard, glossy pellets of cylindrical cross section. This application is a continuation-in-part application of application Serial No. 521,781 filed July 13, 1955.

Conventional rotary pellet mills usually include a housing having an inlet for the comminuted and moistened feed or other material, and an outlet from which the pellets formed in the mill from said comminuted feed may be discharged. Supported in and upon the housing is a rotatable pellet forming die which is provided with a plurality of radially oriented, pellet forming orifices and which encompasses a roller having a serrated surface engageable with an adjacent surface of the rotatable pellet forming die to express or extrude the feed or other material through the orifices in said die in an outward direction. The rotary die is rotatably mounted on the housing of the mill and drives the serrated roller associated therewith.

In extruding pellets through the pellet forming orifices in the die, the roller and the die are subjected to tremendous pressure of the order of 40,000 p. s. i. and tremendous heat is generated within the pellet mill during the pellet forming operation. Thus, to overcome the frictional losses encountered in conventional pellet mills, it is necessary to provide relatively large, electric or other motors to drive the driving die in order to obtain a relatively small production of pellets from the conventional pellet mill.

In addition, since the roller of a conventional pellet mill is suspended in the interior of the die upon bearings which are exposed to the tremendous pressures and heat generated within the die during the pellet forming process, the bearings cannot be adequately lubricated and are exposed to the abrasive action of the finely comminuted feed and rapidly break down, thus necessitating frequent replacement thereof. Not only is the replacement cost of the bearings considerable, but there is a considerable economic waste arising out of the fact that the pellet mill is unusable during the period when the bearings of the roller are being changed.

It is, therefore, an object of my invention to provide a rotary pellet mill which incorporates a rotatable die which is supported upon and rotated by a plurality of symmetrically arranged rollers whose supporting bearings are isolated from the pellet forming areas and which are thus not exposed to the deteriorating effects of heat, pressure, and abrasive material.

Another object of my invention is the provision of a rotary pellet mill of the aforementioned character wherein the drive and supporting rollers constitute a three-point supporting or suspension system for the rotary die which encompasses the same and which is supported solely thereupon. By providing a three-point suspension system of the above described character, it is possible to equalize the forces applied to the rotary die and thus wear upon the rollers and the surface of the die successively engaged thereby is reduced. Furthermore, the down time and bearing costs occasioned by the deterioration of bearings in conventional rotary pellet mill constructions is eliminated with the practical result that the pellet mill of my invention functions over a much longer period of time, more satisfactorily than conventional pellet mills.

Another object of my invention is the provision of a pellet mill of the aforementioned character which can produce a much greater quantity of pellets from a die of given size than is possible with conventional pellet mills because the die surface is exposed to the action of a plurality of rollers during its rotation in a single orbit about said rollers.

An additional object of my invention is the provision of a rotary pellet mill of the aforementioned character which requires a much lower horsepower/output ratio due to the fact that the multipoint suspension of the rotary die upon the rollers reduces frictional losses and bearing wear, thus permitting freer rotation of the die by the drive rollers associated therewith.

Because the rotary die is equally and adequately supported at spaced points upon the drive and supporting rollers, wear between adjacent surfaces of the rollers and the die is equalized and the necessity for replacing worn rollers or a worn die may be deferred for a much longer period of time than is possible with conventional rotary pellet mills.

Other objects and advantages of my invention will be apparent from the following specification and accompanying drawings which are for the purpose of illustration only and in which:

Fig. 1 is a perspective view of a rotary pellet mill constructed in accordance with the teachings of my invention;

Fig. 2 is a top plan view of said pellet mill;

Fig. 3 is a vertical, sectional view taken on the broken line 3—3 of Fig. 1;

Fig. 4 is a vertical, sectional view taken on the broken line 4—4 of Fig. 3;

Fig. 5 is a vertical, sectional view taken on the broken line 5—5 of Fig. 3;

Fig. 6 is a vertical, sectional view taken on the broken line 6—6 of Fig. 3;

Fig. 7 is a sectional view showing means for feeding treated material to the rotary pellet mill;

Fig. 8 is a top plan view taken from the line 8—8 of Fig. 7; and

Fig. 9 is an enlarged, fragmentary view.

Referring to the drawings and particularly to Figs. 1–2 thereof, I show a rotary pellet mill 10 constructed in accordance with the teachings of my invention which is mounted on a bed 12. The bed 12, as best shown in Figs. 1, 3, and 5–6 of the drawings, includes side channels 14 to which are secured end plates 16, as by means of welding or the like.

Mounted upon and extending across the intervening space between the channels 14 and the end plates 16 is a bed plate 18 upon which the various components of the pellet mill 10 are rigidly supported.

Mounted on the lateral extension 20 of the bed 12 is an electric motor 22, said electric motor being operatively connected by means of a belt or belts 24 to a driven wheel or sheave 26 which is mounted for rotation on a shaft 28, as best shown in Figs. 3 and 6 of the drawings, said shaft being supported in bearings 30 located in a gear reducer housing 32. The gear reducer housing 32 is substantially rectangular in configuration and includes relatively massive end plates 34, Fig. 3, which are operatively connected to each other by top and side plates 36 and 38, respectively, to define a gear reducer chamber 40 in which is located a pinion 42 secured intermediate the ends of the shaft 28 by means of a key 44.

A plurality of spur gears 48 is symmetrically mounted on shafts 50 whose opposite extremities are mounted in bearings 52 supported in the end plates 34 of the gear reducer housing 32. Therefore, rotation of the sheave 26 by the belt 24 connected to the motor 22 will cause concomitant rotation of the pinion 42 and the spur gears 48 operatively entrained thereupon to cause rotation of the shafts 50 whose right-hand extremities, as best shown in Fig. 3 of the drawings, project beyond their supporting bearings 52 and the associated end plate 34, said extremities being provided with sockets 54 for the sliding reception of stub shafts 56 connected to first universal joints 58.

Mounted upon and operatively secured to that end of the bed 12 opposite the end upon which the gear reducer housing 32 is mounted is a pellet mill housing, generally indicated at 60, said housing including a relatively massive mounting block 62 at the left-hand end thereof, as best shown in Figs. 1 and 3 of the drawings, said mounting block being provided with symmetrically arranged bores 64, as best shown in Fig. 3 of the drawings, for a purpose which will be described in greater detail below. A circular mounting plate 67 is disposed in spaced relation with the block 62 and secured thereto, in a manner to be described in greater detail below, and is provided with bores 66 concentric with the bores 64. Therefore, material which may pass through the bores 66 falls into the space between the plate 67 and the block 62 because there is no direct communication between the bores 64 and 66.

Secured to the mounting block 62 and adjacent the plate 67, as best shown in Figs. 3 and 4 of the drawings, is an asymmetrically shaped partition plate 70, said plate being provided with arcuately configured concavities 72 defining radiating arms 74 and said arms having flat outer extremities 76 on which are mounted scraper knives 78. A circular face plate 80 overlies and abuts on the partition plate 70 and the face plate 80, the partition plate 70 and the mounting plate 67 are operatively secured to the mounting block 62 by means of bolts 82 which extend through registering bores in said respective members to maintain them in operative relationship with one another. Therefore, the radiating arms 74 of the partition plate 70, in conjunction with the circular face plate 80, partially define first, second, and third receiving chambers 86, 88, and 90, respectively, which are operatively connected to a source of raw material by supply conduits 92 secured to said face plate by means of bolts 94, as best shown in Figs. 1, and 3–4 of the drawings.

The enlarged, right-hand extremities 96 of the drive shafts 98 project through the bores 66 in the mounting plate 67, as best shown in Fig. 3 of the drawings, and are symmetrically arranged about a common center indicated at A in Fig. 4 of the drawings. In the present embodiment of my invention, the use of three symmetrically arranged drive shafts 98 located at 120° intervals about the common center A is indicated, but it is conceivable that a different number of drive shafts be provided so long as the results achieved by the use of the three drive shafts may be attained by said different number.

Pressed upon the extremities 96 of the drive shafts 98 are mounting collars 102 which are held against relative rotation on the extremities 96 by means of keys 104, said collars having drive and suspension rollers 106, in turn, pressed thereupon and restrained from rotation with respect to said collars by means of keys 108. Thus, the drive and suspension rollers 106 serve, as graphically illustrated in Fig. 4 of the drawings, to further define the boundaries of the first, second, and third receiving chambers 86, 88, and 90, respectively, and the peripheries thereof are rotated in the arcuate concavities 72 in the radiating arms 74 of the centrally located partition plate 70. The scraper blades 78 engage the peripheries of associated rollers 106 to strip material accumulated thereupon from the periphery thereof.

Mounted upon and in driven relationship with the drive rollers 106 is an annular die 110, said die, as best shown in Figs. 3 and 4 of the drawings, being provided with flanges 112 on its opposite edges which define a centrally located tread 114 provided with a plurality of symmetrically arranged banks of pellet forming bores 116 through which pellets 118 are extruded, in a manner to be described in greater detail below.

The drive and suspension rollers 106 thus constitute a three-point suspension and drive system for the rotary die 110 and as the drive shafts 98 are rotated to cause rotation of said rollers, the engagement of the peripheries of said rollers with the tread 114 on the interior of the die 110 will cause concomitant rotation of the die 110 in the direction of the arrow 120 in Fig. 4 of the drawings. It will be noted that the opposite flanges 112 on the die 110 engage the opposite edges of the rollers 106, thus maintaining the die 110 in alignment with said rollers. Furthermore, the outer flange 112 encompasses the circular face plate 80 while the inner flange 112 rotates about the circular mounting plate 67.

Because of the three-point suspension and drive system constituted by the drive and supporting rollers 106, the application of driving forces to the tread 114 of the die 110 is symmetrical and unbalanced driving forces characteristic of prior art devices of the character under consideration here are eliminated. Moreover, because of the equalized suspension of the die 110 upon the drive and supporting rollers 106, more effective tractive effort is exerted by the rollers on the tread 114 of the die 110 and more efficient transmittal of driving power to the die 110 is achieved. Also of significance is the fact that the symmetrical arrangement of the drive and supporting rollers 106 equalizes the wear, both upon the rollers 106 and the tread 114 of the die 110, thus eliminating unequal wear between such components characteristic of prior art devices.

Mounted upon the mounting block 62 by means of a bracket 122, as best shown in Figs. 3 and 4 of the drawings, is a substantially annular housing member 124 formed from sheet metal, or the like, and generally channel-shaped in cross section. The housing member 124 defines a discharge chamber 128 into which pellets 118 extruded or expressed through the pellet forming bores 116 in the die 110 are discharged and from which they are expelled through a discharge spout 130 formed integrally therewith.

Mounted within the discharge chamber 128 are break-off blocks or knives 132, said break-off blocks being adjustably supported on threaded rods 134 which are mounted in rotatable nuts 136 secured in the wall of the housing member 124. Rotation of the nuts 136 will cause corresponding inward or outward radial movement of the threaded rods 134 to cause corresponding inward or outward movement of the break-off blocks or knives 132 to determine the ultimate length of pellets extruded through the bores 116 of the die 110.

Located intermediate the gear reducer housing 32 and the pellet mill housing 60 on the bed 12 is an adjustment plate 140 which, as best shown in Fig. 5 of the drawings, is provided with a plurality of bores 142 through which, as best shown in Fig. 3 of the drawings, extend the left-hand extremities of the drive shafts 98. Located in the space between the adjustment plate 140 and the pellet mill housing 60 is a plurality of adjustment sleeves 144 whose opposite extremities are provided with sockets 146, said sockets, as best shown in Figs. 3 and 5 of the drawings, being formed on centers eccentric with the axes of the sleeves 144 to accomplish radial adjustment of the drive shafts 98 and thus the radial adjustment of the drive and supporting rollers 106, in a manner to be described in greater detail below.

Compound roller thrust bearings 148 journal the right-hand extremity of the drive shaft 98 in the adjustment sleeve 144 and a ball bearing 150 is located in the left-hand socket 146 of each of the sleeves to journal the left-hand extremity of the drive shaft 58 in its associated adjustment sleeve. An adjustment flange 154 is formed integrally with each of the adjustment sleeves 144 and is secured in operative relationship with the adjustment plate 140 by means of a plurality of adjustment bolts 156 which are located in elongated slots 158 provided in said flange. Therefore, when it is desired to adjust the drive and supporting rollers, or one of the drive and supporting rollers 106 toward or away from the tread 114 of the die 110, the bolts 156 are loosened and the adjustment flange 154 is rotated in the appropriate direction to accomplish such adjustment by rotating the sockets 146 with respect to the bearings 148 and 150 and thus adjusting the centers of the sockets 146 with respect to the center of the drive shaft 98.

After adjustment has been accomplished, the bolts 156 are tightened against the adjustment flange 154 and the drive and supporting rollers 106 adjusted in the above described manner are maintained securely in the position or positions of adjustment.

It will be noted from the above detailed description of the manner in which the drive rollers 106 are supported upon bearings 148 and 150 remote from and external to the interior of the pellet mill housing 60 that said bearings are not subjected to the abrasive effects of the material located in the interior of said housing, nor to the heat generated in said housing during the extrusion of pellets through the die 110. Therefore, the bearing life of the bearings 148 and 150 supporting the drive shafts 98 is materially prolonged. Furthermore, due to the provision of the adjustment sleeves 144, it is possible to adjust the drive and supporting rollers 106 with respect to the tread 114 of the die 110 during the operation of the pellet mill 10 and thus to obtain optimum driving and driven relationships between the drive and supporting rollers 106 and the die 110 and, furthermore, the production of optimum pellets from the combined die and rollers.

The left-hand ends of the drive shafts 98 are connected by means of universal joints 162 to transmission shafts 164 which are connected to the universal joints 58 mounted on the stub shafts 56.

The provision of first, second, and third receiving chambers 86, 88, and 90 encompassed by the annular, rotary die 110 creates a problem because difficulty may be encountered in causing equal distribution of material to each of said chambers if conventional material feeding means were utilized. To obviate this difficulty, I provide feeding means 170, as best shown in Figs. 7-9 of the drawings, said feeding means including a hopper 172 for the reception of raw material such as comminuted alfalfa or grain, said hopper being operatively connected to a chamber 174 in which is located a feed screw 176, said feed screw being energized by a drive chain 178 connected to an appropriate source of power, not shown.

If desired, the chamber 174 can be connected by a conduit 180 to a source of steam or the like which will serve as a moistening agent in order that the material being fed through the chamber 174 by the action of the feed screw 176 may be treated by the moistening agent in order to properly prepare it for extrusion in pellet form by the rotary die 110 and its associated rollers 106.

Connected to the outlet of the chamber 174 is an elongated rectangular housing 182, said housing being supported upon a frame 184 in juxtaposition to the housing 124 of the rotary pellet mill. As the material, designated generally at 186, is expelled from the outlet end of the chamber 174 by the action of the feed screw 176 into the chamber 190 defined by the walls of the housing 182, it falls upon the upper surface of spreader means 192, said spreader means being constituted by an oscillatable plate 194 which extends across the chamber 190 and which has its outer ends projecting beyond the walls of the rectangular housing 182. Roller means 196 are, as best shown in Figs. 8 and 9 of the drawings, mounted on the exterior of the housing 182 for engagement with the lateral edges of the oscillatable plate 194 and a crank 198 connected to an eccentric 202 rotatable by an appropriate power source causes the oscillation of the plate 194 during the feeding of material 186 from the end of the chamber 174 by the action of the feed screw 176.

Therefore, while the normal tendency of the material from the end of the chamber 174 into the chamber 190 would be to flow in a straight line, rapid oscillation of the spreader means 192 constituted by the plate 194 causes the material 186 to be rapidly shaken from side to side of the chamber 190 in order to equalize the depth and flow patterns thereof, as indicated by the arrow 204 in Fig. 8 of the drawings.

The lower portion of the chamber 190 incorporates distributor means, indicated generally at 206 in Figs. 7 and 8 of the drawings, said distributor means being constituted by adjustable baffle plates 208 whose lower extremities are mounted upon pivot pins 210 which permit lateral adjustment of the baffle plates toward or away from each other, as indicated by the arrows 212 in Fig. 8 of the drawings. The upper extremities of the baffle plates 208 have adjustment screws 214 operatively connected thereto, said adjustment screws being mounted for rotation in nuts 216 secured to the side walls of the housing 182.

Therefore, should the flow of material 186 from the spreader means 192 constituted by the oscillatable plate 194 not be sufficiently equalized to insure that the desired quantity of material will flow through each of the supply conduits 92 to the respective compartments or chambers 86, 88, and 90 of the pellet mill, rotation of the distributing means 206 constituted by the baffle plates 208, as caused by the rotation of the adjustment screws 214 in the appropriate direction will cause more or less material to be fed to the individual compartments of the pellet mill. Moreover, the feeding means constituted by the supply hopper 172, the treating chamber 174, and the spreading means 192 and distributing means 206 can be utilized to supply greater or lesser amounts of material to selected compartments 86, 88, or 90 of the pellet mill to counteract whatever gravitational effects may be encountered due to the specific location of the respective compartments in relationship to the orbit of the rotary die 110. Thus, if difficulty is encountered in maintaining adequate feeding of material to the rotary die in any compartment, greater amounts of material can be fed to that compartment than are fed to the other compartments encompassed by the rotary die 110.

I thus provided by my invention a rotary pellet mill which is characterized particularly by its efficiency of operation as evaluated by power-input, product-output calculations and which is also characterized by a much greater effective life than conventional pellet mills. The efficiency and prolonged life of the pellet mill of my invention is attributable to many of the factors described in detail hereinabove and briefly alluded to previously, among them being the three-point suspension of the rotary die upon rollers which, in turn, serve to drive the die to accomplish the extrusion of pellets therethrough. Moreover, it will be noted that the rollers 106, in conjunction with the partition plate 70, the face plate 80, and the tread 114 of the rotary die 110, define the first, second, and third receiving chambers 86, 88, and 90 into which comminuted material or grain is fed through the supply conduit 92.

As the rollers 106 are rotated upon the drive shafts 98 associated therewith, rotation of the die 110 in the same direction is accomplished and material deposited in the receiving chambers 86, 88, and 90 is fed between the nip of the rollers and the tread of the die 110 causing the material to be extruded through the pellet forming bores 116 to provide pellets 118 in the manner graphically illustrated in Fig. 4 of the drawings. As the pellets are extruded, they are broken or sheared off by the respective break-off plates or knives 132 associated with the perimeter of the die 110. Thus, for a given diameter of die, much more effective utilization of said die is attained because there are three rollers which operate simultaneously upon associated segments of the die to obtain a triple production of the pellets from the die.

After the pellets 118 have been broken or sheared from the periphery of the die 110, they are discharged through the spout 130 into any appropriate receptacle or means of storage.

As previously indicated, the pressures generated within a die of the character under consideration here range in the area of 40,000 p. s. i. and it is readily apparent that such pressures generate tremendous heat which, if the bearings mounting the rollers were located in the interior of the pellet forming die 110, would result in rapid bearing deterioration, as is the case with conventional rotary pellet mills. However, the provision in the present construction of bearings which are isolated from and disposed externally of the pellet forming die 110 materially prolongs the life of the bearings and insures that they will not be exposed to the accelerated effects of heat, pressure, and abrasion resulting from the material being pelletized.

In addition, the tractive effort exerted upon the die 110 by its associated rollers 116 can be adjusted by adjustment of the sleeves 144, as described hereinabove, during the operation of the pellet mill so that optimum adjustment may be obtained, as judged by the pellet output and the quality thereof. Of course, the three-point suspension achieved by the provision of a plurality of rollers equalizes wear on rollers and die alike and materially increases both roller and die life.

Moreover, when it becomes necessary to replace the bearings supporting the drive shaft 98, it is merely necessary to pull the adjustment sleeve 144 associated with said bearings and to replace the same which can be done without, in any way, entering the interior of the housing 60 of the pellet mill.

I claim:

1. In a pellet mill, the combination of: a power source; a plurality of drive rollers connected to said power source, said rollers having die-engaging peripheral surfaces; and a die supported on said rollers for rotation thereby, said die having a plurality of die openings therein for the expression of material therethrough by said rollers.

2. In a pellet mill, the combination of: a power source; a plurality of die-driving rollers having peripheral die-engaging surfaces, each of said rollers being connected to said power source; and a rotary die supported upon and encompassing said rollers having a plurality of die openings therein, said rotary die having an internally located surface successively engageable by said rollers to cause said rollers to drive said die and express material through said openings.

3. In a pellet mill, the combination of: a power source; a plurality of die-driving rollers having peripheral die-engaging surfaces, each of said rollers being connected to said power source and being adjustable outwardly or inwardly with reference to a common center; and a rotary die supported upon and encompassing said rollers having a plurality of die openings therein, said rotary die having an internally located surface successively engageable by said rollers to cause said rollers to drive said die and express material through said openings.

4. In a rotary pellet mill, the combination of: a power source; a plurality of drive rollers universally connected to said power source; and a rotary die supported upon and driven by said rollers, said die having a plurality of die openings extending between opposite surfaces of said die and said rollers successively engaging one of said surfaces to express material through said openings.

5. In a rotary pellet mill, the combination of: a housing having a centrally located partition therein partially defining a plurality of material receiving chambers in said housing; a multi-point die suspension and driving system in said housing including supporting and drive members located adjacent said partition and defining therewith said material receiving chambers; and a rotary die supported upon and driven by said members within said housing and having a surface engageable by said members.

6. In a rotary pellet mill, the combination of: a housing having a centrally located partition therein partially defining a plurality of material receiving chambers in said housing; a three-point die suspension and driving system in said housing including supporting and drive members located adjacent said partition and defining therewith said material receiving chambers; and a rotary die supported upon and driven by said members within said housing and having a surface engageable by said members.

7. In a rotary pellet mill, the combination of: a housing having a centrally located partition therein partially defining a plurality of material receiving chambers in said housing; a multi-point die suspension and driving system in said housing including supporting and drive members located adjacent said partition and defining therewith said material receiving chambers; a rotary die supported upon and driven by said members within said housing and having a surface engageable by said members; and a power source connected to said members by universal joints for rotating said members.

8. In a rotary pellet mill, the combination of: a housing having a centrally located partition therein partially defining a plurality of material receiving chambers in said housing; a multi-point die suspension and driving system in said housing including supporting and drive members located adjacent said partition and defining therewith said material receiving chambers, said member being adjustable toward and away from one another; and a rotary die supported upon and driven by said members within said housing and having a surface engageable by said members.

References Cited in the file of this patent

UNITED STATES PATENTS

| | | |
|---|---|---|
| 1,467,883 | Sizer | Sept. 11, 1923 |
| 2,063,404 | Selman | Dec. 8, 1936 |
| 2,124,744 | Meakin | July 26, 1938 |
| 2,240,660 | Meakin | May 6, 1941 |
| 2,260,302 | Driscoll et al. | Oct. 28, 1941 |
| 2,594,894 | Fehrenbach | Apr. 29, 1952 |
| 2,653,350 | Piperoux | Sept. 29, 1953 |
| 2,699,272 | Barth | Jan. 11, 1955 |
| 2,764,951 | Fisher | Oct. 2, 1956 |
| 2,798,444 | Meakin | July 9, 1957 |